UNITED STATES PATENT OFFICE.

WILHELM MANASSE AND RICHARD IHLENFELD, OF BERLIN, GERMANY.

PROCESS OF PRESERVING MEAT.

SPECIFICATION forming part of Letters Patent No. 681,236, dated August 27, 1901.

Application filed May 9, 1901. Serial No. 59,408. (No specimens.)

*To all whom it may concern:*

Be it known that we, WILHELM MANASSE, physician, residing at Rosenthalerstrasse 6, and RICHARD IHLENFELD, cook, residing at Altonaerstrasse, Berlin, Germany, subjects of the Emperor of Germany, have invented a certain new and useful Process of Preserving Meat; and we hereby declare the following to be a full, clear, and exact description of the invention, such as will enable others skilled in the art to which it appertains to make and use the same.

The object of our invention is the manufacture of preserves of meat and flesh meats in a cooked state.

For carrying out our invention we use the following steps: We boil or roast meat in any known manner until it is done and then treat it with diluted hydrochloric acid—for instance, by immersing the cooked meat in diluted hydrochloric acid and allowing it to remain some time in the acid. Then we take the meat out of the acid and inclose it in an especially-prepared gelatinous meat-broth that will solidify after cooling. We prepare the gelatinous meat-broth by boiling meat, flesh wastes, bones, sinews, or such like with water and add a substance, such as bicarbonate of sodium, though we do not limit ourselves to this substance.

In order to carry out our invention, we may proceed in the following manner: We boil or roast meat until it is done in any suitable way. Then we immerse the meat in a solution of hydrochloric acid. This solution should preferably contain two parts of hydrochloric acid in a thousand parts of water. However, the concentration can be varied. The operator will find the suitable concentration by experiments. The time during which the meat should remain in the acid may vary. A term between ten minutes and half an hour will be sufficient in most cases. The operator will find the time required by experiments. If the piece of meat is thick, a longer time will be required than if it is thin. Then we take the meat out of the acid solution and inclose it in a gelatinous meat-broth contained in a suitable cask or vessel of glass, tin, or the like. The gelatinous meat-broth has been preferably clarified by a treatment with albumen in any known manner and has been mixed with bicarbonate of sodium. The amount of the bicarbonate of sodium will depend on the amount of acid retained in the meat and will be found by the operator by experiments. The gelatinous meat-broth is used, preferably, in a warm or hot state and will solidify after cooling. Finally, we sterilize the product and close the vessel or the cask in any known manner.

We are aware that the treatment of meat with hydrochloric acid or with gelatinous substance has been previously proposed for making meat preserves. We do not claim any of the steps separately, but limit ourselves to the use of the described combination. The preserved meat according to our process has a better taste than that preserved by the known methods. The good appearance of the preserve will not be deteriorated by the influence of light when we use glass vessels. The gelatinous substances will remain transparent. When tins are used by our process, the danger of poisoning by means of decomposition of the metallic surface of the tin is obviated. By the contact of tin with gelatinous substances no protochlorid of tin is formed.

Having now particularly described and ascertained the nature of our said invention and in what manner the same is to be performed, we declare that what we claim is—

1. The herein-described process of preserving meat consisting of cooking the meat, immersing the cooked meat in diluted acid, then removing it from the acid and placing it in a gelatinous liquid and then adding a substance to neutralize the acid.

2. The herein-described process of preserving meat consisting in cooking the meat, immersing the cooked meat in diluted hydrochloric acid, taking it out of the acid and placing it in a gelatinous liquid to which a substance is added to neutralize the acid and then sterilizing the product.

3. The herein-described process of preserving meat, consisting in cooking the meat, immersing the cooked meat in a solution of two parts of hydrochloric acid to one thousand parts of water, removing it from the acid solution and placing it in a gelatinous liquid to which has been added a substance adapted to neutralize the acid and then sterilizing the product.

4. The herein-described process of preserving meat consisting in cooking the meat, immersing the same in diluted hydrochloric acid, removing it from the acid and placing it in a gelatinous liquid previously clarified with albumen and mixed with a substance adapted to neutralize the acid and then sterilizing the product.

5. The herein-described process of preserving meat consisting in cooking the meat, immersing the same in diluted hydrochloric acid, removing it from the acid and placing it in a gelatinous liquid previously clarified with albumen and mixed with bicarbonate of sodium and sterilizing the product substantially as described.

In witness whereof we have hereunto set our hands in presence of two witnesses.

WILHELM MANASSE.
RICHARD IHLENFELD.

Witnesses:
WOLDEMAR HAUPT,
HENRY HASPER.